United States Patent [19]

Bossi et al.

[11] Patent Number: 4,802,080

[45] Date of Patent: Jan. 31, 1989

[54] POWER TRANSFER CIRCUIT INCLUDING A SYMPATHETIC RESONATOR

[75] Inventors: Burt J. Bossi, Indianapolis; Mark A. Eberhart, Shelbyville, both of Ind.

[73] Assignee: American Telephone and Telegraph Company, AT&T Information Systems, Holmdel, N.J.

[21] Appl. No.: 169,901

[22] Filed: Mar. 18, 1988

[51] Int. Cl.[4] ............................................ H02P 13/00
[52] U.S. Cl. ........................................ 363/75; 363/20; 363/90
[58] Field of Search ...................... 363/18, 19, 20, 21, 363/75, 90, 132; 323/307, 308

[56] References Cited

U.S. PATENT DOCUMENTS

| | | | |
|---|---|---|---|
| 3,531,737 | 9/1970 | Thakore | 363/18 X |
| 4,027,200 | 5/1977 | Sahara et al. | 363/20 X |
| 4,277,837 | 7/1981 | Stuckert | 364/900 |
| 4,284,489 | 8/1981 | Weber | 204/298 |
| 4,325,008 | 4/1982 | Borland et al. | 363/75 X |
| 4,480,178 | 10/1984 | Miller et al. | 235/380 |
| 4,499,530 | 2/1985 | Onda et al. | 363/17 |
| 4,631,652 | 12/1986 | Wendt | 363/16 |
| 4,692,604 | 9/1987 | Billings | 235/493 |

OTHER PUBLICATIONS

Application Ser. #851,849 Files 4-14-86, "Power Regulator for a Contactless Credit Card System", R. L. Billings.

"Does Your Coupling Coefficient Matter?", *Electronics & Wireless World*, Tom Ivall, 6/87, pp. 577-579.

Primary Examiner—Patrick R. Salce
Assistant Examiner—Kristine Peckman
Attorney, Agent, or Firm—Michael A. Morra

[57] ABSTRACT

A power transfer circuit includes first and second windings (L1, L2) sharing a common magnetic core (101). Each winding has associated with it a parallel capacitor to thus form a pair of "tank" circuits. The first winding (L1) is connected at one end to a voltage supply and, at the other end, to ground through an FET switch (100,200). The switch (100,200) is turned on and off at a predetermined frequency and at a 50% duty cycle. The second winding (L2) and associated capacitor (C2) achieves parallel resonance at the predetermined frequency. Similarly the combined first and second windings (L1,L2) and associated capacitors (C1,C2) achieve parallel resonance at said predetermined frequency. The second winding (L2) need not be electrically connected to the first winding (L1) which transfers energy to it through the magnetic core (101). The transfer circuit efficiently couples power across a dielectric interface to a pickup coil (L3). One particularly good application of the power transfer circuit is in connection with a contactless Smart Card.

12 Claims, 2 Drawing Sheets

४,८०२,०८०

POWER TRANSFER CIRCUIT INCLUDING A SYMPATHETIC RESONATOR

TECHNICAL FIELD

This invention relates to a circuit for efficently transferring electrical power across the windings of a transformer, and more particularly to the transfer of power across an air-gap interface.

BACKGROUND OF THE INVENTION

The transfer of electrical power from a primary to a secondary winding of a transformer is a well known task. However, when the primary and secondary windings are separated by an air gap, and when the available power is limited, it is extremely important to maximize power transfer efficency. Such a situation is encountered in connection with Smart Cards having an air-gap (contactless) interface. In one early design, power was transferred across a contactless interface via compacitive coupling. U.S. Pat. No. 4,480,178 discloses a tuning arrangement designed to enhance such coupling. Nevertheless, greater efficiency was needed, so transformer coupling was used to increase transfer efficiency. U.S. Pat. No, 4,692,604 teaches the use of a flexible magnetic but non-magnetostrictive core piece for use in connection with an inductor acting as the secondary portion of a power transformer. While significant improvement is achieved, only a limited amount of magnetic material can be used in the available space, and situations arise where only a small battery is available to provide power across the contactless interface.

It is therefore an object of the present invention to improve power transfer efficiency of a transformer whose primary and secondary windings are separated by an air-gap.

It is another object of the present invention to achieve efficient power transfer from a low voltage source.

SUMMARY OF THE INVENTION

A circuit for coupling power between a primary winding of a transformer and a secondary winding thereof includes a first capacitor in parallel with the primary winding. This primary tank circuit is connected at one end, to a voltage source; and, at the other end, to ground through a switching circuit that operates at a predetermined frequency.

This circuit is improved by the addition of a third winding, tightly coupled to the primary winding and having a second capacitor in parallel with it. This so-called "sympathetic" tank circuit cooperates with the primary tank circuit to absorb magnetic energy via a common magnetic core, and transfer it to the secondary thereby improving the overall power transfer efficiency.

It is a feature of the present invention that efficient power transfer is achieved in a cost effective manner requiring very few components.

DETAILED DESCRIPTION

Figure 3:
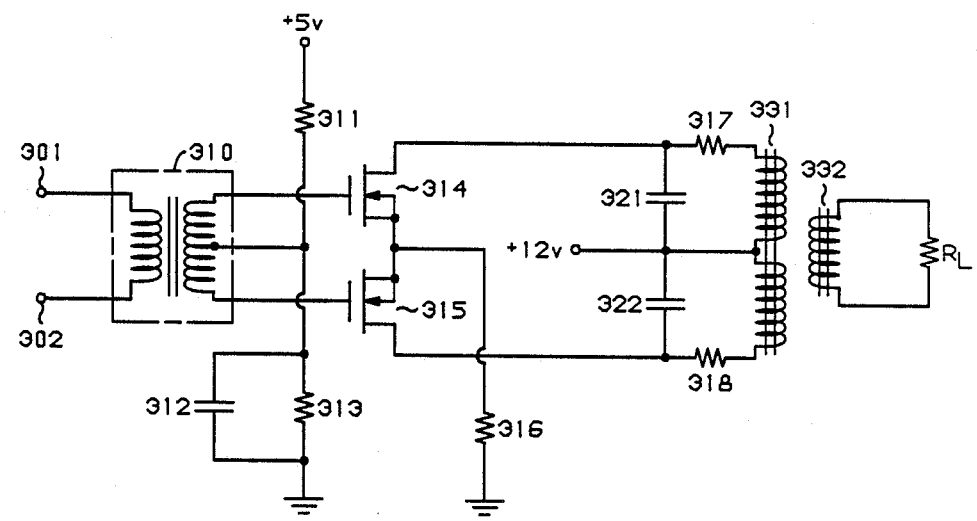
FIG. 3 is a schematic drawing of a prior art power transfer circuit.

The prior art power transfer circuit of FIG. 3 is disclosed in U.S. Application Ser. No. 851,849 filed on Apr. 14, 1986, and functions to deliver power and timing to load resistor $R_L$. It is understood that $R_L$ represents the load equivalent of circuitry that rectifies, filters, and ultimately dissipates the transferred power. It is further understood that $R_L$ is seldom purely resistive, especially at the frequencies used in the present invention.

A timing signal is presented to terminals 301, 302 and comprises a high frequency sine wave. Transformer 310 steps-up the voltage; its secondary winding is center tapped to split the output into two signals—180 degrees apart.

The drive circuit of the power amplifier consists of two FETs, 314–315, arranged as a push-pull, class B amplifier. Tuning capacitors 321, 322 and resistors 316–318 are used for wave shaping.

The push-pull configuration is used to obtain a larger peak-to-peak output swing from the fixed supply than would be possible with a single device amplifier. Theoretically, a peak-to-peak swing of four times the supply voltage can be obtained when the output coil is resonated. Obtaining this output swing is important because it allows the primary to have more turns for the same voltage output at the secondary. This is turn lowers circuit Q, and consequently circuit losses. The peak swing on each FET gate can be as high as 18 volts in the present circuit. This swing is intentionally made high to insure that all devices will turn on hard, thus reducing the variation of "on" channel resistance that might be encountered over various devices if a low drive level is used.

FETs 314, 315 have a $V_t$ of 2 to 4 volts, and an "on" channel resistance of 2.4 ohms max. The gate drives are provided by a center tapped transformer output, with the center tap DC biased at 1.8 volts nominally to reduce deadband during transition intervals. A voltage divider comprising resistors 311, 313 along with filter capacitor 312 provides the necessary bias.

Capacitors 321–322 are used to resonate the primary coil 331. Without definite tuning, the primary would be excited at its self-resonant frequency and produce severe ringing which would create the possibility of false clock pulses appearing on the secondary. Tuning also makes the primary circuit look like a "real" load to the drive circuit, thus greatly reducing reactive current components in the drive and the associated losses. The tuning capacitance is split between capacitors 321–322, each having double the required value of capacitance and placed in series across the primary halves. This provides a smoother and more symmetrical output waveform than a single capacitor placed across the entire primary coil 331.

Returning to FIG. 1, an illustrative embodiment of the invention is disclosed. A clock signal $V_c$, operating at the 1.8432 MHz rate, is used to drive FETs 100, 200 through resistors $R_1$, $R_3$. One suitable FET is the 2N7000 which is available, for example, from Siliconix and has an "on" resistance of less than 5 ohms. FETs 100, 200 turn on and drive node B substantially to ground through resistor $R_2$ which has a value of 3.3 ohms in this example embodiment. Resistor $R_2$ is used to limit the maximum current allowed to flow through primary coil $L_1$. Two FETs (100, 200) are used in combination with $R_2$ in order to minimize the effect of variations in "on" impedance between FET devices. This technique improves control over the maximum current limit and hence the maximum power coupled to the secondary. Similarly, capacitor $C_3$ eliminates the effect associated with wiring inductance in the voltage source which is important at the present current level and frequency.

Figure 1:
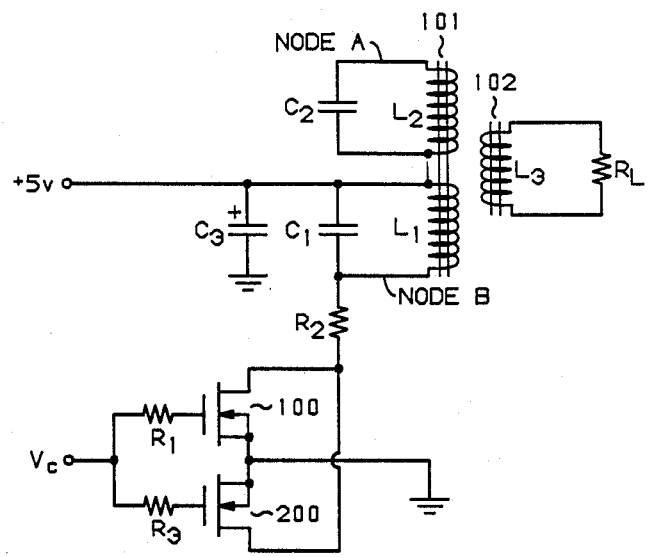
FIG. 1 is a schematic drawing of a power transfer circuit in accordance with the invention.

As the current changes through $L_1$, its opposition to change (reactance) results in a continual exchange of energy between the 5 volt source and its flux—or magnetic field. The magnetic field energy is absorbed by magnetic core 101 which in turn transfers it to a "sympathetic" tank circuit comprising components $L_2$, $C_2$. Although coil $L_2$ shares magnetic core 101 with coil $L_1$, it need not be electrically connected to it. $L_1$ and $L_2$ are connected for convenience in manufacture as shown in FIG. 1. In this example embodiment, it is noted that magnetic cores 101 and 102 are separated by an air-gap which makes this circuit particularly useful in a contactless Smart Card application where power and timing need to be transferred across a dielectric interface. Another feature making this circuit attractive is the use of a low voltage (5 volt) source to deliver adequate power to load impedance $R_L$.

A tuning procedure to be followed in selecting component values is set forth below.

i. Measure the value of $L_2$ and then select the value of $C_2$ to achieve unloaded parallel resonance at the clock frequency in accordance with the following equation:

$$f_p = \frac{1}{2\pi \sqrt{LC}} \sqrt{1 - \frac{R_L^2 C}{L}} \quad (1)$$

ii. measure total inductance $L_T = L_1 + L_2 + M_{1:2}$ and then select a value for the total capacitance $C_T$ in parallel with $L_T$ to achieve parallel resonance at the clock frequency according to equation (1).

iii. Select a value for $C_1$ that satisfys the following equation for series connected capacitors:

$$C_T = \frac{C_1 C_2}{C_1 + C_2} \quad (2)$$

Coils $L_1$ and $L_2$ are tightly coupled and have an unloaded mutual inductance $M_{1:2}$. Example component values are set forth below:

| $C_1$ = 1200 pf | $L_1$ = 2.0 $\mu$H |
| $C_2$ = 3700 pf | $L_2$ = 2.0 $\mu$H |
| $C_3$ = 47 $\mu$f | $M_{1:2}$ = 1.25 $\mu$H |

The primary winding comprises 16 turns of 33 gauge wire; it is center tapped so that each inductor $L_1$, $L_2$ has 8 turns. The secondary winding comprises 36 turns of 41 gauge wire.

Figure 2:
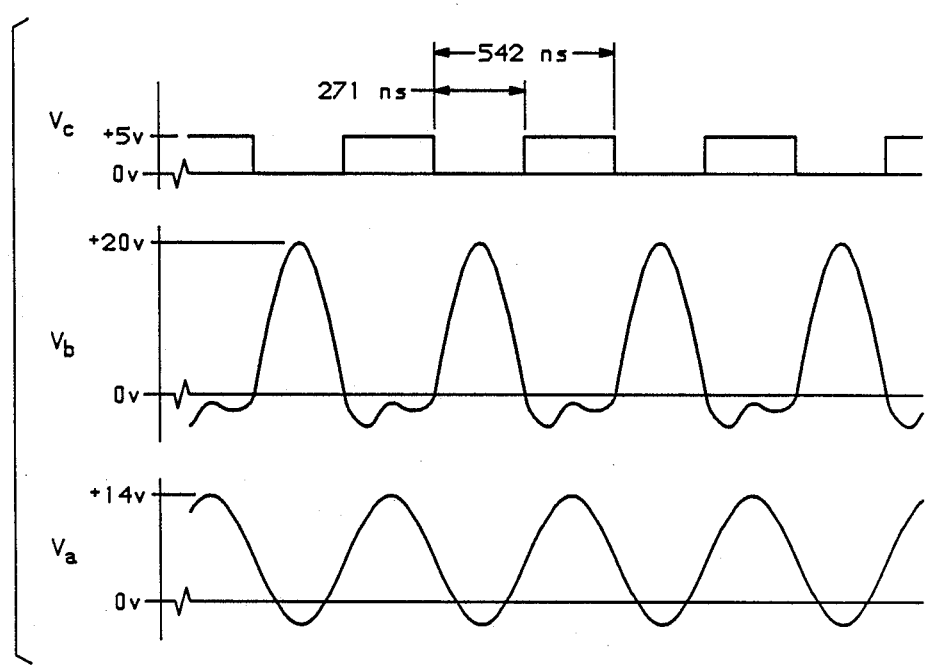
FIG. 2 illustrates various waveforms associated with the circuit of FIG. 1.

Referring now to FIG. 2 there is shown a series of waveforms that illustrate the time interrelation of various signals and assist in the understanding of the circuit. Clock signal $V_c$, in this example embodiment is a symmetrical square wave that switches between 0 volts and +5 volts at a 1.8432 MHz rate.

The instantaneous voltage at node B, designated $V_b$, is driven toward ground when transistor 100 is turned "on". Resistor $R_2$ and the "on" impedance of transistors 100, 200 allow $V_b$ to fluctuate somewhat in the vicinity of zero volts at this time. When transistors 100, 200 are turned "off", the current through $L_1$ seeks to continue in the same direction. Accordingly, $V_b$ becomes more positive and delivers current to capacitor $C_1$. Indeed, when transistors 100, 200 are turned off, the combined primary tank circuits resonate at a frequency determined by the values of the individual components which, in this design, has been selected to be 1.8432 MHz—the clock frequency. At this time, the entire primary circuit is free-oscillating because FETs 100, 200 are turned off.

The instantaneous voltage at node A, designated $V_a$, has a DC average voltage of +5 volts and fluctuates in a substantially sinusoidal manner. Voltages $V_a$ and $V_b$ combine to optimize power transfer across the air-gap interface to load impedance $R_L$. Observing the various waveforms of FIG. 3 demonstrates that the tank circuit comprising components $C_1$, $L_1$, $C_2$, $L_2$, provides one-half of the sine wave drive to the secondary load, and the tank circuit comprising components $C_2$, $L_2$ (sympathetic resonator) provides the other half. The resulting primary voltage is sinusoidal with a peak-to-peak value of nearly 40 volts.

The prior art circuit of FIG. 3 has a power transfer efficiency of approximately 10%. By comparison, the inventive circuit of FIG. 1, including a sympathetic resonator, provides a power transfer efficiency in excess of 20%. This circuit is capable of supplying 20 ma across a 0.08 inch air-gap. Average current in the primary is typically 35 ma without the secondary load connected and 85 ma with the secondary load connected—depending on air-gap.

The present invention is most useful in supplying power to a contactless Smart Card. The frequency associated with power transfer is used by the Smart Card as its clock reference. In the FIG. 1 embodiment, $L_3$ represents the inductive load associated with the transformer secondary. Maximum power transfer is achieved when the secondary circuit is purely resistive which can be accomplished by adding a capacitor in series with resistor $R_L$. This capacitor is selected to series resonate with $L_3$ at the power transfer frequency.

Of particular interest, however, is the situation in which the secondary load is reactive. As the secondary coil is brought into the magnetic field of the primary coil, power transfer efficiency drops off due to slight de-tuning caused by a reactive load being reflected into the primary circuit. Such de-tuning provides an important advantage in that it minimizes certain effects due to misalignment. Although power transfer efficiency between primary and secondary coils decreases as these coils are brought into perfect alignment, the actual amount of power transfer remains substantially constant over a broad range of alignments.

Although a particular embodiment has been disclosed, it is understood that various modifications are possible within the spirit and scope of the invention. For example, at higher frequencies the need for capacitor $C_1$ is satisfied by stray capacitance. Further, the magnitude and polarity at the supply voltage and ground may be changed or reversed without detracting from the principles of the invention.

What is claimed is:

1. In a power transfer system for coupling a waveform of predetermined frequency from a primary side of a transformer to a secondary side thereof, said primary and secondary sides being separated by an air-gap or dielectric material, the primary side comprising a first winding that is parallel connected to a first capacitor and coupled to a primary magnetic core, said first winding being connected in series with a switching means between a pair of voltage sources characterized by:

a resonator circuit comprising a second winding that is parallel connected to a second capacitor and shares the primary magnetic core with the first winding, the resonator circuit being magnetically coupled to, and exclusively driven by, signal energy generated by said first winding, the resonator circuit being adapted to parallel resonate at the predetermined frequency.

2. The system of claim 1 wherein the unloaded parallel resonance frequency of the combined first and second windings and the first and second capacitors is the predetermined frequency.

3. The system of claim 1 wherein the first and second windings are series connected, their junction being electrically connected to one of the voltage sources.

4. The system of claim 2 wherein the switching means comprises a transistor that is driven between an "on" state and an "off" state thereof at the predetermined frequency, the duration of said on and off states being substantially equal.

5. The system of claim 2 wherein the secondary side of the transformer includes a third winding coupled to a secondary magnetic core and series connected to a load impedance said primary and secondary magnetic cores being separated by an air-gap.

6. The system of claim 5 wherein the combined input impedance of the third winding and the load impedance has an overall reactive characteristic such that the circuit of the primary side becomes progressively detuned as the magnitude of the air-gap is decreased.

7. A power transfer system for coupling electrical energy at a predetermined frequency across a dielectrical interface to a portable data card, the system including a driver unit and a data card, the driver unit comprising:

a first coil parallel connected to a first capacitor and coupled to a magnetic core member, said first coil being series connected to a switching means between a pair of voltage sources, the switching means being switched between "on" and "off" states at the predetermined frequency;

a second coil parallel connected to a second capacitor and coupled to the magnetic core member, said second coil being solely driven by the magnetic flux in the magnetic core, the impedance values of the second coil and the second capacitor being selected to resonate at the predetermined frequency, the data card comprising;

a third coil, series connected to a load impedance and embedded between dielectric layers of the data card, for receiving electrical energy at the predetermined frequency from said first and second coils.

8. A power transfer system comprising a driving member and a portable receiving member, the driving member having inductive and capacitive elements tuned to parallel resonate at a predetermined frequency when the driving and receiving members are separated by a significant distance, the inductive and capacitive elements being driven at the predetermined frequency by an oscillator means, the inductive elements comprising two or more primary coils mutually coupled to each other through a common magnetic core, the portable receiving member comprising a secondary coil series connected to a load impedance, the secondary coil being adapted to receive electrical energy when brought into the proximity of the magnetic field of the primary coils, the combined input impedance of the secondary coil and its load impedance having an overall reactive characteristic such that the inductive and capacitive elements of the driving member become progressively detuned as the portable receiving member is brought into closer alignment with the driving member, whereby the overall power transfer between driving and receiving members is rendered insensitive to separation over a range of alignments.

9. A circuit for magnetically coupling an electrical signal having one predominant frequency across a dielectric interface, one side of the dielectric interface being designated its primary side and the other side being designated its secondary side, the primary side of the dielectric interface including a pair of tank circuits each comprising a parallel connected coil and capacitor, the coils of said tank circuits sharing a common magnetic core, one of the tank circuits being exclusively driven by the other tank circuit and tuned to resonate at the predominant frequency, said other tank circuit being driven by an oscillator means at the predominant frequency.

10. The circuit of claim 9 wherein the combined pair of tank circuits resonates at the predominant frequency.

11. The circuit of claim 10 wherein the oscillator means includes two or more parallel connected transistors simultaneously switched between on and off states at the predominant frequency.

12. The circuit of claim 9 wherein the pair of tank circuits comprises two series-connected inductors in a parallel electrical connection with two seriesconnected capacitors, the junction of the seriesconnected inductors being electrically connected to the junction of the series-connected capacitors.

* * * * *